(12) United States Patent
Harel et al.

(10) Patent No.: US 11,361,014 B2
(45) Date of Patent: Jun. 14, 2022

(54) SYSTEM AND METHOD FOR COMPLETING A USER PROFILE

(71) Applicant: Cortica, Ltd., Tel Aviv (IL)

(72) Inventors: Adam Harel, Tel Aviv (IL); Igal Raichelgauz, Tel Aviv (IL); Karina Odinaev, Tel Aviv (IL); Yehoshua Y Zeevi, Haifa (IL)

(73) Assignee: CORTICA LTD., Tel Aviv (IL)

( * ) Notice: Subject to any disclaimer, the term of this patent is extended or adjusted under 35 U.S.C. 154(b) by 587 days.

(21) Appl. No.: 15/858,331

(22) Filed: Dec. 29, 2017

(65) Prior Publication Data

US 2018/0246885 A1    Aug. 30, 2018

Related U.S. Application Data

(63) Continuation-in-part of application No. 14/597,324, filed on Jan. 15, 2015, now abandoned, which is a
(Continued)

(30) Foreign Application Priority Data

Oct. 26, 2005  (IL) .......................................... 171577
Jan. 29, 2006  (IL) .......................................... 173409

(51) Int. Cl.
*G06F 16/41*   (2019.01)
*G06F 16/14*   (2019.01)
*G06F 16/435*  (2019.01)

(52) U.S. Cl.
CPC .............. *G06F 16/41* (2019.01); *G06F 16/14* (2019.01); *G06F 16/152* (2019.01);
(Continued)

(58) Field of Classification Search
CPC ...... G06F 16/9535; G06F 16/41; G06F 16/14; G06F 16/152; G06F 16/437; Y10S 707/99943; Y10S 707/99948
See application file for complete search history.

(56) References Cited

U.S. PATENT DOCUMENTS 4,733,353 A   3/1988  Jaswa
4,932,645 A   6/1990  Schorey et al.
(Continued)

FOREIGN PATENT DOCUMENTS

WO       0231764       4/2002
WO    2003005242 A1    1/2003
(Continued)

OTHER PUBLICATIONS

Queluz, "Content-Based Integrity Protection of Digital Images", SPIE Conf. on Security and Watermarking of Multimedia Contents, San Jose, Jan. 1999, pp. 85-93, downloaded from http://proceedings.spiedigitallibrary.org/ on Aug. 2, 2017.
(Continued)

*Primary Examiner* — Mohammad S Rostami
(74) *Attorney, Agent, or Firm* — Reches Patents

(57) ABSTRACT

A system and method for at least partially completing a user profile. The method includes analyzing the user profile to identify at least one missing informational element in the user profile, wherein identifying the at least one missing element further comprises determining at least one concept based on the user profile and matching the determined at least one concept to a plurality of category concepts, each concept including a collection of signatures and metadata describing the concept, wherein each category concept is associated with at least one required informational element, wherein each missing informational element is one of the at least one required informational element that is not included in the user profile; sending a query for the missing infor-
(Continued)

mational element; and updating at least a portion of the user profile based on a response to the query.

19 Claims, 6 Drawing Sheets

Related U.S. Application Data continuation-in-part of application No. 13/766,463, filed on Feb. 13, 2013, now Pat. No. 9,031,999, which is a continuation-in-part of application No. 13/602,858, filed on Sep. 4, 2012, now Pat. No. 8,868,619, which is a continuation of application No. 12/603,123, filed on Oct. 21, 2009, now Pat. No. 8,266,185, which is a continuation-in-part of application No. 12/538,495, filed on Aug. 10, 2009, now Pat. No. 8,312,031, which is a continuation-in-part of application No. 12/348,888, filed on Jan. 5, 2009, now Pat. No. 9,798,795, which is a continuation-in-part of application No. 12/195,863, filed on Aug. 21, 2008, now Pat. No. 8,326,775, and a continuation-in-part of application No. 12/084,150, filed as application No. PCT/IL2006/001235 on Oct. 26, 2006, now Pat. No. 8,655,801, said application No. 12/538,495 is a continuation-in-part of application No. 12/195,863, filed on Aug. 21, 2008, now Pat. No. 8,326,775, and a continuation-in-part of application No. 12/084,150, filed as application No. PCT/IL2006/001235 on Oct. 26, 2006, now Pat. No. 8,655,801, said application No. 12/603,123 is a continuation-in-part of application No. 12/195,863, filed on Aug. 21, 2008, now Pat. No. 8,326,775, and a continuation-in-part of application No. 12/084,150, filed as application No. PCT/IL2006/001235 on Oct. 26, 2006, now Pat. No. 8,655,801, said application No. 12/195,863 is a continuation-in-part of application No. 12/084,150, filed as application No. PCT/IL2006/001235 on Oct. 26, 2006, now Pat. No. 8,655,801.

(52) U.S. Cl.
CPC ..... *G06F 16/437* (2019.01); *Y10S 707/99943* (2013.01); *Y10S 707/99948* (2013.01)

(56) References Cited

U.S. PATENT DOCUMENTS

| | | |
|---|---|---|
| 4,972,363 A | 11/1990 | Nguyen et al. |
| 5,307,451 A | 4/1994 | Clark |
| 5,568,181 A | 10/1996 | Greenwood et al. |
| 5,745,678 A | 4/1998 | Herzberg et al. |
| 5,806,061 A | 9/1998 | Chaudhuri et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,940,821 A | 8/1999 | Wical |
| 5,978,754 A | 11/1999 | Kumano |
| 5,987,454 A | 11/1999 | Hobbs |
| 6,038,560 A | 3/2000 | Wical |
| 6,052,481 A | 4/2000 | Grajski et al. |
| 6,076,088 A | 6/2000 | Paik et al. |
| 6,122,628 A | 9/2000 | Castelli et al. |
| 6,137,911 A | 10/2000 | Zhilyaev |
| 6,144,767 A | 11/2000 | Bottou et al. |
| 6,147,636 A | 11/2000 | Gershenson |
| 6,240,423 B1 | 5/2001 | Hirata |
| 6,243,375 B1 | 6/2001 | Speicher |
| 6,243,713 B1 | 6/2001 | Nelson et al. |
| 6,269,307 B1 | 7/2001 | Shinmura |
| 6,275,599 B1 | 8/2001 | Adler et al. |
| 6,329,986 B1 | 12/2001 | Cheng |
| 6,363,373 B1 | 3/2002 | Steinkraus |
| 6,381,656 B1 | 4/2002 | Shankman |
| 6,411,229 B2 | 6/2002 | Kobayashi |
| 6,422,617 B1 | 7/2002 | Fukumoto et al. |
| 6,493,692 B1 | 12/2002 | Kobayashi et al. |
| 6,493,705 B1 | 12/2002 | Kobayashi et al. |
| 6,507,672 B1 | 1/2003 | Watkins et al. |
| 6,523,022 B1 | 2/2003 | Hobbs |
| 6,523,046 B2 | 2/2003 | Liu et al. |
| 6,524,861 B1 | 2/2003 | Anderson |
| 6,526,400 B1 | 2/2003 | Takata et al. |
| 6,550,018 B1 | 4/2003 | Abonamah et al. |
| 6,560,597 B1 | 5/2003 | Dhillon et al. |
| 6,594,699 B1 | 7/2003 | Sahai et al. |
| 6,601,060 B1 | 7/2003 | Tomaru |
| 6,611,628 B1 | 8/2003 | Sekiguchi et al. |
| 6,611,837 B2 | 8/2003 | Schreiber |
| 6,618,711 B1 | 9/2003 | Ananth |
| 6,640,015 B1 | 10/2003 | Lafruit |
| 6,643,620 B1 | 11/2003 | Contolini et al. |
| 6,643,643 B1 | 11/2003 | Lee et al. |
| 6,675,159 B1 | 1/2004 | Lin et al. |
| 6,704,725 B1 | 3/2004 | Lee |
| 6,728,706 B2 | 4/2004 | Aggarwal et al. |
| 6,732,149 B1 | 5/2004 | Kephart |
| 6,751,363 B1 | 6/2004 | Natsev et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,819,797 B1 | 11/2004 | Smith et al. |
| 6,836,776 B2 | 12/2004 | Schreiber |
| 6,845,374 B1 | 1/2005 | Oliver et al. |
| 6,901,207 B1 | 5/2005 | Watkins |
| 6,938,025 B1 | 8/2005 | Lulich et al. |
| 6,963,975 B1 | 11/2005 | Weare |
| 6,970,881 B1 | 11/2005 | Mohan et al. |
| 6,978,264 B2 | 12/2005 | Chandrasekar et al. |
| 7,006,689 B2 | 2/2006 | Kasutani |
| 7,013,051 B2 | 3/2006 | Sekiguchi et al. |
| 7,043,473 B1 | 5/2006 | Rassool et al. |
| 7,124,149 B2 | 10/2006 | Smith et al. |
| 7,158,681 B2 | 1/2007 | Persiantsev |
| 7,199,798 B1 | 4/2007 | Echigo et al. |
| 7,215,828 B2 | 5/2007 | Luo |
| 7,260,564 B1 | 8/2007 | Lynn et al. |
| 7,277,928 B2 | 10/2007 | Lennon |
| 7,296,012 B2 | 11/2007 | Ohashi |
| 7,302,117 B2 | 11/2007 | Sekiguchi et al. |
| 7,313,805 B1 | 12/2007 | Rosin et al. |
| 7,346,629 B2 | 3/2008 | Kapur et al. |
| 7,392,238 B1 | 6/2008 | Zhou et al. |
| 7,406,459 B2 | 7/2008 | Chen et al. |
| 7,450,740 B2 | 11/2008 | Shah et al. |
| 7,523,102 B2 | 4/2009 | Bjarnestam et al. |
| 7,526,607 B1 | 4/2009 | Singh et al. |
| 7,536,384 B2 | 5/2009 | Venkataraman et al. |
| 7,542,969 B1 | 6/2009 | Rappaport et al. |
| 7,548,910 B1 | 6/2009 | Chu et al. |
| 7,555,477 B2 | 6/2009 | Bayley et al. |
| 7,555,478 B2 | 6/2009 | Bayley et al. |
| 7,562,076 B2 | 7/2009 | Kapur |
| 7,574,436 B2 | 8/2009 | Kapur et al. |
| 7,574,668 B2 | 8/2009 | Nunez et al. |
| 7,577,656 B2 | 8/2009 | Kawai et al. |
| 7,657,100 B2 | 2/2010 | Gokturk et al. |
| 7,660,468 B2 | 2/2010 | Gokturk et al. |
| 7,694,318 B2 | 4/2010 | Eldering et al. |
| 7,801,893 B2 | 9/2010 | Gulli |
| 7,836,054 B2 | 11/2010 | Kawai et al. |
| 7,860,895 B1 | 12/2010 | Scofield |
| 7,920,894 B2 | 4/2011 | Wyler |
| 7,921,107 B2 | 4/2011 | Chang et al. |
| 7,933,407 B2 | 4/2011 | Keidar et al. |

(56) References Cited

U.S. PATENT DOCUMENTS

| | | |
|---|---|---|
| 7,974,994 B2 | 7/2011 | Li et al. |
| 7,987,194 B1 | 7/2011 | Walker et al. |
| 7,987,217 B2 | 7/2011 | Long et al. |
| 7,991,715 B2 | 8/2011 | Schiff et al. |
| 8,000,655 B2 | 8/2011 | Wang et al. |
| 8,023,739 B2 | 9/2011 | Hohimer et al. |
| 8,036,893 B2 | 10/2011 | Reich |
| 8,098,934 B2 | 1/2012 | Vincent et al. |
| 8,112,376 B2 | 2/2012 | Raichelgauz et al. |
| 8,266,185 B2 | 9/2012 | Raichelgauz et al. |
| 8,275,764 B2 | 9/2012 | Jeon |
| 8,311,950 B1 | 11/2012 | Kunal |
| 8,312,031 B2 | 11/2012 | Raichelgauz et al. |
| 8,315,442 B2 | 11/2012 | Gokturk et al. |
| 8,316,005 B2 | 11/2012 | Moore |
| 8,326,775 B2 | 12/2012 | Raichelgauz et al. |
| 8,345,982 B2 | 1/2013 | Gokturk et al. |
| RE44,225 E | 5/2013 | Aviv |
| 8,527,978 B1 * | 9/2013 | Sallam .................. G06F 8/65 713/161 |
| 8,548,828 B1 | 10/2013 | Longmire |
| 8,634,980 B1 | 1/2014 | Urmson |
| 8,655,801 B2 | 2/2014 | Raichelgauz et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,781,152 B2 | 7/2014 | Momeyer |
| 8,782,077 B1 | 7/2014 | Rowley |
| 8,799,195 B2 | 8/2014 | Raichelgauz et al. |
| 8,799,196 B2 | 8/2014 | Raichelguaz et al. |
| 8,818,916 B2 | 8/2014 | Raichelgauz et al. |
| 8,868,619 B2 | 10/2014 | Raichelgauz et al. |
| 8,880,539 B2 | 11/2014 | Raichelgauz et al. |
| 8,880,566 B2 | 11/2014 | Raichelgauz et al. |
| 8,880,640 B2 | 11/2014 | Graham |
| 8,886,648 B1 | 11/2014 | Procopio et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,165,406 B1 | 10/2015 | Gray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,252,961 B2 | 2/2016 | Bosworth |
| 9,256,668 B2 | 2/2016 | Raichelgauz et al. |
| 9,298,763 B1 * | 3/2016 | Zack .................. G06F 16/337 |
| 9,323,754 B2 | 4/2016 | Ramanathan et al. |
| 9,325,751 B2 | 4/2016 | Bosworth |
| 9,330,189 B2 | 5/2016 | Raichelgauz et al. |
| 9,438,270 B2 | 9/2016 | Raichelgauz et al. |
| 9,440,647 B1 | 9/2016 | Sucan |
| 9,542,694 B2 | 1/2017 | Bosworth |
| 9,734,533 B1 | 8/2017 | Givot |
| 9,911,334 B2 | 3/2018 | Townsend |
| 9,996,845 B2 | 6/2018 | Zhang |
| 10,133,947 B2 | 11/2018 | Yang |
| 10,347,122 B2 | 7/2019 | Takenaka |
| 10,491,885 B1 | 11/2019 | Hicks |
| 2001/0019633 A1 | 9/2001 | Tenze |
| 2001/0038876 A1 | 11/2001 | Anderson |
| 2001/0056427 A1 | 12/2001 | Yoon et al. |
| 2002/0010682 A1 | 1/2002 | Johnson |
| 2002/0019881 A1 | 2/2002 | Bokhari et al. |
| 2002/0019882 A1 | 2/2002 | Bokhani |
| 2002/0037010 A1 | 3/2002 | Yamauchi |
| 2002/0038299 A1 | 3/2002 | Zernik et al. |
| 2002/0059580 A1 | 5/2002 | Kalker et al. |
| 2002/0072935 A1 | 6/2002 | Rowse et al. |
| 2002/0087530 A1 | 7/2002 | Smith et al. |
| 2002/0099870 A1 | 7/2002 | Miller et al. |
| 2002/0103813 A1 | 8/2002 | Frigon |
| 2002/0107827 A1 | 8/2002 | Benitez-Jimenez et al. |
| 2002/0123928 A1 | 9/2002 | Eldering et al. |
| 2002/0126872 A1 | 9/2002 | Brunk et al. |
| 2002/0129140 A1 | 9/2002 | Peled et al. |
| 2002/0129296 A1 | 9/2002 | Kwiat et al. |
| 2002/0143976 A1 | 10/2002 | Barker et al. |
| 2002/0147637 A1 | 10/2002 | Kraft et al. |
| 2002/0152087 A1 | 10/2002 | Gonzalez |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas |
| 2002/0174095 A1 | 11/2002 | Lulich et al. |
| 2002/0178410 A1 | 11/2002 | Haitsma et al. |
| 2002/0184505 A1 | 12/2002 | Mihcak |
| 2003/0028660 A1 | 2/2003 | Igawa et al. |
| 2003/0037010 A1 | 2/2003 | Schmelzer |
| 2003/0041047 A1 | 2/2003 | Chang |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 | 5/2003 | Birmingham et al. |
| 2003/0101150 A1 | 5/2003 | Agnihotri |
| 2003/0105739 A1 | 6/2003 | Essafi et al. |
| 2003/0126147 A1 | 7/2003 | Essafi et al. |
| 2003/0182567 A1 | 9/2003 | Barton et al. |
| 2003/0191764 A1 | 10/2003 | Richards |
| 2003/0191776 A1 | 10/2003 | Obrador |
| 2003/0200217 A1 | 10/2003 | Ackerman |
| 2003/0217335 A1 | 11/2003 | Chung |
| 2003/0229531 A1 | 12/2003 | Heckerman et al. |
| 2004/0003394 A1 | 1/2004 | Ramaswamy |
| 2004/0025180 A1 | 2/2004 | Begeja et al. |
| 2004/0047461 A1 | 3/2004 | Weisman |
| 2004/0059736 A1 | 3/2004 | Willse |
| 2004/0068510 A1 | 4/2004 | Hayes et al. |
| 2004/0091111 A1 | 5/2004 | Levy |
| 2004/0107181 A1 | 6/2004 | Rodden |
| 2004/0111465 A1 | 6/2004 | Chuang et al. |
| 2004/0117367 A1 | 6/2004 | Smith et al. |
| 2004/0119848 A1 | 6/2004 | Buehler |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0230572 A1 | 11/2004 | Omoigui |
| 2004/0249779 A1 | 12/2004 | Nauck et al. |
| 2004/0260688 A1 | 12/2004 | Gross |
| 2004/0267774 A1 | 12/2004 | Lin |
| 2005/0010553 A1 | 1/2005 | Liu |
| 2005/0021394 A1 | 1/2005 | Miedema et al. |
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0172130 A1 | 8/2005 | Roberts |
| 2005/0177372 A1 | 8/2005 | Wang et al. |
| 2005/0193015 A1 | 9/2005 | Logston |
| 2005/0238238 A1 | 10/2005 | Xu et al. |
| 2005/0245241 A1 | 11/2005 | Durand et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0100987 A1 * | 5/2006 | Leurs .................. H04N 5/44543 |

(56) References Cited

U.S. PATENT DOCUMENTS

| | | |
|---|---|---|
| 2006/0112035 A1 | 5/2006 | Cecchi et al. |
| 2006/0120626 A1 | 6/2006 | Perlmutter |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0224529 A1 | 10/2006 | Kermani |
| 2006/0236343 A1 | 10/2006 | Chang |
| 2006/0242130 A1 | 10/2006 | Sadri |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1 | 11/2006 | Barton |
| 2006/0251292 A1 | 11/2006 | Gokturk |
| 2006/0251338 A1 | 11/2006 | Gokturk |
| 2006/0251339 A1 | 11/2006 | Gokturk |
| 2006/0253423 A1 | 11/2006 | McLane et al. |
| 2006/0288002 A1 | 12/2006 | Epstein |
| 2007/0009159 A1 | 1/2007 | Fan |
| 2007/0011151 A1 | 1/2007 | Hagar et al. |
| 2007/0019864 A1 | 1/2007 | Koyama et al. |
| 2007/0033163 A1 | 2/2007 | Epstein et al. |
| 2007/0038608 A1 | 2/2007 | Chen |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0083611 A1 | 4/2007 | Farago et al. |
| 2007/0091106 A1 | 4/2007 | Moroney |
| 2007/0130112 A1 | 6/2007 | Lin |
| 2007/0130159 A1 | 6/2007 | Gulli et al. |
| 2007/0157224 A1* | 7/2007 | Pouliot ............... H04H 20/14 725/22 |
| 2007/0168413 A1 | 7/2007 | Barletta et al. |
| 2007/0174320 A1 | 7/2007 | Chou |
| 2007/0195987 A1 | 8/2007 | Rhoads |
| 2007/0196013 A1 | 8/2007 | Li |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2007/0298152 A1 | 12/2007 | Baets |
| 2008/0046406 A1 | 2/2008 | Seide et al. |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0109433 A1* | 5/2008 | Rose ..................... G06Q 30/02 |
| 2008/0152231 A1 | 6/2008 | Gokturk |
| 2008/0163288 A1 | 7/2008 | Ghosal et al. |
| 2008/0165861 A1 | 7/2008 | Wen |
| 2008/0166020 A1 | 7/2008 | Kosaka |
| 2008/0172615 A1 | 7/2008 | Igelman et al. |
| 2008/0201299 A1 | 8/2008 | Lehikoinen et al. |
| 2008/0201326 A1 | 8/2008 | Cotter |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0253737 A1 | 10/2008 | Kimura |
| 2008/0263579 A1 | 10/2008 | Mears et al. |
| 2008/0270373 A1 | 10/2008 | Oostveen et al. |
| 2008/0270569 A1 | 10/2008 | McBride |
| 2008/0294278 A1 | 11/2008 | Borgeson |
| 2008/0313140 A1 | 12/2008 | Pereira et al. |
| 2009/0013414 A1 | 1/2009 | Washington et al. |
| 2009/0022472 A1* | 1/2009 | Bronstein ............ G11B 27/329 386/278 |
| 2009/0024641 A1 | 1/2009 | Quigley et al. |
| 2009/0034791 A1 | 2/2009 | Doretto |
| 2009/0037408 A1 | 2/2009 | Rodgers |
| 2009/0043637 A1 | 2/2009 | Eder |
| 2009/0043818 A1 | 2/2009 | Raichfigauz |
| 2009/0080759 A1 | 3/2009 | Bhaskar |
| 2009/0089251 A1 | 4/2009 | Johnston |
| 2009/0089587 A1 | 4/2009 | Brunk et al. |
| 2009/0119157 A1 | 5/2009 | Dulepet |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0216761 A1 | 8/2009 | Raichfigauz |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0277322 A1 | 11/2009 | Cai et al. |
| 2009/0278934 A1 | 11/2009 | Ecker |
| 2010/0042646 A1 | 2/2010 | Raichelgauz |
| 2010/0082684 A1* | 4/2010 | Churchill ............ G06F 16/9535 707/784 |
| 2010/0104184 A1 | 4/2010 | Bronstein |
| 2010/0111408 A1 | 5/2010 | Matsuhira |
| 2010/0125569 A1 | 5/2010 | Nair |
| 2010/0162405 A1 | 6/2010 | Cook |
| 2010/0173269 A1 | 7/2010 | Puri et al. |
| 2010/0268524 A1 | 10/2010 | Nath et al. |
| 2010/0306193 A1 | 12/2010 | Pereira |
| 2010/0318493 A1 | 12/2010 | Wessling |
| 2010/0322522 A1 | 12/2010 | Wang et al. |
| 2011/0029620 A1* | 2/2011 | Bonforte ................ H04L 67/10 709/206 |
| 2011/0038545 A1 | 2/2011 | Bober |
| 2011/0052063 A1 | 3/2011 | McAuley et al. |
| 2011/0055585 A1 | 3/2011 | Lee |
| 2011/0145068 A1 | 6/2011 | King et al. |
| 2011/0202848 A1 | 8/2011 | Ismalon |
| 2011/0246566 A1* | 10/2011 | Kashef ................ G06F 16/437 709/203 |
| 2011/0251896 A1 | 10/2011 | Impollonia et al. |
| 2011/0296315 A1 | 12/2011 | Lin et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0133497 A1 | 5/2012 | Sasaki |
| 2012/0150890 A1 | 6/2012 | Jeong et al. |
| 2012/0167133 A1 | 6/2012 | Carroll |
| 2012/0179751 A1 | 7/2012 | Ahn |
| 2012/0185445 A1 | 7/2012 | Borden et al. |
| 2012/0197857 A1 | 8/2012 | Huang |
| 2012/0229028 A1 | 9/2012 | Ackermann |
| 2012/0239694 A1 | 9/2012 | Avner et al. |
| 2012/0299961 A1 | 11/2012 | Ramkumar et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0086499 A1 | 4/2013 | Dyor et al. |
| 2013/0089248 A1 | 4/2013 | Remiszewski |
| 2013/0103814 A1 | 4/2013 | Carrasco |
| 2013/0104251 A1 | 4/2013 | Moore et al. |
| 2013/0108179 A1* | 5/2013 | Marchesotti ............ G06T 11/60 382/224 |
| 2013/0110949 A1* | 5/2013 | Maurel .................. G06Q 30/02 709/206 |
| 2013/0159298 A1 | 6/2013 | Mason et al. |
| 2013/0170746 A1* | 7/2013 | Zhang .................. H04N 19/61 382/165 |
| 2013/0173635 A1 | 7/2013 | Sanjeev |
| 2013/0191323 A1 | 7/2013 | Raichelgauz |
| 2013/0211656 A1 | 8/2013 | An |
| 2013/0212493 A1 | 8/2013 | Krishnamurthy |
| 2013/0226820 A1 | 8/2013 | Sedota, Jr. |

(56) References Cited

U.S. PATENT DOCUMENTS

| | | |
|---|---|---|
| 2013/0226930 A1 | 8/2013 | Arngren |
| 2013/0325550 A1 | 12/2013 | Varghese et al. |
| 2013/0332951 A1 | 12/2013 | Gharaat et al. |
| 2013/0339386 A1* | 12/2013 | Serrano ............ G06F 16/24526 707/770 |
| 2014/0019264 A1 | 1/2014 | Wachman et al. |
| 2014/0025692 A1* | 1/2014 | Pappas .................. G06F 16/00 707/754 |
| 2014/0040232 A1 | 2/2014 | Raichelgauz |
| 2014/0059443 A1 | 2/2014 | Tabe |
| 2014/0095425 A1 | 4/2014 | Sipple |
| 2014/0111647 A1 | 4/2014 | Atsmon |
| 2014/0125703 A1 | 5/2014 | Roveta |
| 2014/0147829 A1 | 5/2014 | Jerauld |
| 2014/0149443 A1 | 5/2014 | Raichelgauz |
| 2014/0152698 A1 | 6/2014 | Kim et al. |
| 2014/0176604 A1 | 6/2014 | Venkitaraman et al. |
| 2014/0188786 A1 | 7/2014 | Raichelgauz |
| 2014/0189536 A1 | 7/2014 | Lange |
| 2014/0193077 A1 | 7/2014 | Shiiyama et al. |
| 2014/0201330 A1 | 7/2014 | Lozano Lopez |
| 2014/0250032 A1 | 9/2014 | Huang et al. |
| 2014/0270350 A1* | 9/2014 | Rodriguez-Serrano ...................... G06K 9/6267 382/103 |
| 2014/0282655 A1 | 9/2014 | Roberts |
| 2014/0300722 A1 | 10/2014 | Garcia |
| 2014/0310825 A1 | 10/2014 | Raichelgauz et al. |
| 2014/0330830 A1 | 11/2014 | Raichelgauz et al. |
| 2014/0341471 A1 | 11/2014 | Ono |
| 2014/0379477 A1* | 12/2014 | Sheinfeld ........... G06Q 30/0251 705/14.58 |
| 2015/0009129 A1 | 1/2015 | Song |
| 2015/0033150 A1 | 1/2015 | Lee |
| 2015/0081725 A1 | 3/2015 | Ogawa |
| 2015/0117784 A1 | 4/2015 | Lin |
| 2015/0134318 A1 | 5/2015 | Cuthbert |
| 2015/0134688 A1 | 5/2015 | Jing |
| 2015/0154189 A1 | 6/2015 | Raichelgauz |
| 2015/0237472 A1* | 8/2015 | Alsina ................... H04W 4/021 455/456.3 |
| 2015/0242689 A1 | 8/2015 | Mau |
| 2015/0286742 A1 | 10/2015 | Zhang et al. |
| 2015/0289022 A1 | 10/2015 | Gross |
| 2015/0317836 A1 | 11/2015 | Beaurepaire |
| 2015/0348102 A1* | 12/2015 | Alsina ................ G06Q 30/0255 705/14.53 |
| 2015/0363644 A1 | 12/2015 | Wnuk |
| 2016/0026707 A1 | 1/2016 | Ong et al. |
| 2016/0171785 A1 | 6/2016 | Banatwala |
| 2016/0210525 A1 | 7/2016 | Yang |
| 2016/0221592 A1 | 8/2016 | Puttagunta |
| 2016/0307048 A1 | 10/2016 | Krishnamoorthy |
| 2016/0342683 A1 | 11/2016 | Kwon |
| 2016/0342863 A1 | 11/2016 | Kwon |
| 2016/0357188 A1 | 12/2016 | Ansari |
| 2017/0032257 A1 | 2/2017 | Sharifi |
| 2017/0041254 A1 | 2/2017 | Agara Venkatesha Rao |
| 2017/0066452 A1 | 3/2017 | Scofield |
| 2017/0072851 A1 | 3/2017 | Shenoy |
| 2017/0109602 A1 | 4/2017 | Kim |
| 2017/0150047 A1 | 5/2017 | Jung |
| 2017/0255620 A1 | 9/2017 | Raichelgauz |
| 2017/0259819 A1 | 9/2017 | Takeda |
| 2017/0262437 A1 | 9/2017 | Raichelgauz |
| 2017/0277691 A1 | 9/2017 | Agarwal |
| 2017/0323568 A1 | 11/2017 | Inoue |
| 2018/0081368 A1 | 3/2018 | Watanabe |
| 2018/0101177 A1 | 4/2018 | Cohen |
| 2018/0157916 A1 | 6/2018 | Doumbouya |
| 2018/0158323 A1 | 6/2018 | Takenaka |
| 2018/0204111 A1 | 7/2018 | Zadeh |
| 2018/0286239 A1 | 10/2018 | Kaloyeros |
| 2018/0300654 A1 | 10/2018 | Prasad |
| 2019/0005726 A1 | 1/2019 | Nakano |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0061784 A1 | 2/2019 | Koehler |
| 2019/0065951 A1 | 2/2019 | Luo |
| 2019/0188501 A1 | 6/2019 | Ryu |
| 2019/0220011 A1 | 7/2019 | Della Penna |
| 2019/0236954 A1 | 8/2019 | Komura |
| 2019/0317513 A1 | 10/2019 | Zhang |
| 2019/0320512 A1 | 10/2019 | Zhang |
| 2019/0364492 A1 | 11/2019 | Azizi |
| 2019/0384303 A1 | 12/2019 | Muller |
| 2019/0384312 A1 | 12/2019 | Herbach |
| 2019/0385460 A1 | 12/2019 | Magzimof |
| 2019/0389459 A1 | 12/2019 | Berntorp |
| 2019/0392710 A1 | 12/2019 | Kapoor |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |

FOREIGN PATENT DOCUMENTS

| | | |
|---|---|---|
| WO | 2003067467 A1 | 8/2003 |
| WO | 2004019527 A1 | 3/2004 |
| WO | 2005027457 A1 | 3/2005 |
| WO | 20070049282 | 5/2007 |
| WO | 2014137337 A1 | 9/2014 |
| WO | 2016040376 A1 | 3/2016 |

OTHER PUBLICATIONS

Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-1.

Ribert et al. "An Incremental Hierarchical Clustering", Visicon Interface 1999, pp. 586-591.

Santos, et al., "SCORM-MPEG: an Ontology of Interoperable Metadata for Multimedia and e-Learning", 2015 23rd International Conference on Software, Telecommunications and Computer Networks (SoftCOM) Year: 2015, pp. 224-228, DOI: 10.1109/SOFTCOM.2015.7314122 IEEE Conference Publications.

Scheper et al., "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.

Schneider, et al., "A Robust Content Based Digital Signature for Image Authentication", Proc. ICIP 1996, Laussane, Switzerland, Oct. 1996, pp. 227-230.

Semizarov et al. "Specificity of Short Interfering RNA Determined through Gene Expression Signatures", PNAS, 2003, pp. 6347-6352.

Shih-Fu Chang, et al., "VideoQ: A Fully Automated Video Retrieval System Using Motion Sketches", 1998, IEEE, , New York, pp. 1-2.

The International Search Report and the Written Opinion for PCT/US2016/050471, ISA/RU, Moscow, RU, dated May 4, 2017.

The International Search Report and the Written Opinion for PCT/US2016/054634 dated Mar. 16, 2017, ISA/RU, Moscow, RU.

The International Search Report and the Written Opinion for PCT/US2017/015831, ISA/RU, Moscow, Russia, dated Apr. 20, 2017.

Theodoropoulos et al., "Simulating Asynchronous Architectures on Transputer Networks", Proceedings of the Fourth Euromicro Workshop on Parallel and Distributed Processing, 1996. PDP '96.

(56) References Cited

OTHER PUBLICATIONS

Vailaya, et al., "Content-Based Hierarchical Classification of Vacation Images," I.E.E.E.: Multimedia Computing and Systems, vol. 1, 1999, East Lansing, MI, pp. 518-523.
Wallet, et al., "Personalized Content Retrieval in Context Using Ontological Knowledge," IEEE Transactions on Circuits and Systems for Video Technology, vol. 17, No. 3, Mar. 2007, pp. 336-346.
Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.
Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.
Wang et al. "A Signature for Content-based Image Retrieval Using a Geometrical Transform", ACM 1998, pp. 229-234.
Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.
Wei-Te Li et al., "Exploring Visual and Motion Saliency for Automatic Video Object Extraction", IEEE, vol. 22, No. 7, Jul. 2013, pp. 1-11.
Whitby-Strevens, "The Transputer", 1985 IEEE, Bristol, UK.
Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
Yanagawa, et al., "Columbia University's Baseline Detectors for 374 LSCOM Semantic Visual Concepts." Columbia University ADVENT technical report, 2007, pp. 222-2006-8.
Yanai, "Generic Image Classification Using Visual Knowledge on the Web," MM'03, Nov. 2-8, 2003, Tokyo, Japan, pp. 167-176.
Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.
Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.
Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.
Zhou et al., "Medical Diagnosis With C4.5 Rule Preceded by Artificial Neural Network Ensemble"; IEEE Transactions an Information Technology in Biomedicine, vol. 7, Issue: 1, pp. 37-42, Date of Publication: Mar. 2003.
Zhu et al., Technology-Assisted Dietary Assessment. Computational Imaging VI, edited by Charles A. Bouman, Eric L. Miller, Ilya Pollak, Proc, of SPIE-IS&T Electronic Imaging, SPIE vol. 6814, 681411, Copyright 2008 SPIE-IS&T. pp. 1-10.
Zou, et al., "A Content-Based Image Authentication System with Lossless Data Hiding", ICME 2003, pp. 213-216.
Ma Et El. ("Semantics modeling based image retrieval system using neural networks" 2005 (Year: 2005).
Boari et al, "Adaptive Routing for Dynamic Applications in Massively Parallel Architectures", 1995 IEEE, Spring 1995.
Brecheisen, et al., "Hierarchical Genre Classification for Large Music Collections", ICME 2006, pp. 1385-1388.
Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Cernansky et al., "Feed-forward Echo State Networks"; Proceedings of International Joint Conference on Neural Networks, Montreal, Canada, Jul. 31-Aug. 4, 2005.
Chuan-Yu Cho, et al., "Efficient Motion-Vector-Based Video Search Using Query by Clip", 2004, IEEE, Taiwan, pp. 1-4.
Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.
Cococcioni, et al., "Automatic Diagnosis of Defects of Rolling Element Bearings Based on Computational Intelligence Techniques", University of Pisa, Pisa, Italy, 2009.
Emami, et al., "Role of Spatiotemporal Oriented Energy Features for Robust Visual Tracking in Video Surveillance, University of Queensland", St. Lucia, Australia, 2012.
Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.
Foote, Jonathan et al., "Content-Based Retrieval of Music and Audio"; 1997, Institute of Systems Science, National University of Singapore, Singapore (Abstract).
Freisleben et al., "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Gomes et al., "Audio Watermaking and Fingerprinting: For Which Applications?" University of Rene Descartes, Paris, France, 2003.
Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.
Guo et al, "AdOn: An Intelligent Overlay Video Advertising System", SIGIR, Boston, Massachusetts, Jul. 19-23, 2009.
Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.
Hua, et al., "Robust Video Signature Based on Ordinal Measure", Image Processing, 2004. 2004 International Conference on Image Processing (ICIP), vol. 1, IEEE, pp. 685-688, 2004.
Ihab Al Kabary, et al., "SportSense: Using Motion Queries to Find Scenes in Sports Videos", Oct. 2013, ACM, Switzerland, pp. 1-3.
International Search Authority: "Written Opinion of the International Searching Authority" (PCT Rule 43bis.1) Including International Search Report for International Patent Application No. PCT/US2008/073852; dated Jan. 28, 2009.
International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; Date of Issuance: Jul. 28, 2009.
International Search Report for the corresponding International Patent Application PCT/IL2006/001235; dated Nov. 2, 2008.
IPO Examination Report under Section 18(3) for corresponding UK application No. GB1001219.3, dated Sep. 12, 2011.
Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Iwamoto, K.; Kasutani, E.; Yamada, A.; , "Image Signature Robust to Caption Superimposition for Video Sequence Identification," Image Processing, 2006 IEEE International Conference on, vol.,

(56) References Cited

OTHER PUBLICATIONS

No., pp. 3185-3188, Oct. 8-11, 2006 doi: 10.1109/ICIP.2006. 313046URL:http://ieeexplore.ieee.org/stamp/stamp.jsp?tp=&arnumber=4107247&isnumber=4106440.
Jaeger, H.: "The "echo state" approach to analysing and training recurrent neural networks", GMD Report, No. 148, 2001, pp. 1-43, XP002466251 German National Research Center for Information Technology.
Jianping Fan et al., "Concept-Oriented Indexing of Video Databases: Towards Semantic Sensitive Retrieval and Browsing", IEEE, vol. 13, No. 7, Jul. 2004, pp. 1-19.
Johnson, John L., "Pulse-Coupled Neural Nets: Translation, Rotation, Scale, Distortion, and Intensity Signal nvariance for Images." Applied Optics, vol. 33, No. 26, 1994, pp. 6239-6253.
Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.
Lin, C.; Chang, S.;, "Generating Robust Digital Signature for Image/Video Authentication,"Multimedia and Security Workshop at ACM Multimedia '98. Bristol, U.K. Sep. 1998, pp. 49-54.
Lin, et al., "Robust Digital Signature for Multimedia Authentication: A Summary", IEEE Circuits and Systems Magazine, 4th Quarter 2003, pp. 23-26.
Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.
Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Maass, W. et al.: "Computational Models for Generic Cortical Microcircuits", Institute for Theoretical Computer Science, Technische Universitaet Graz, Graz, Austria, published Jun. 10, 2003.
Mahdhaoui, et al, "Emotional Speech Characterization Based on Multi-Features Fusion for Face-to-Face Interaction", Universite Pierre et Marie Curie, Paris, France, 2009.
Marti, et al, "Real Time Speaker Localization and Detection System for Camera Steering in Multiparticipant Videoconferencing Environments", Universidad Politecnica de Valencia, Spain, 2011.
May et al., "The Transputer", Springer-Verlag, Berlin Heidelberg, 1989, teaches multiprocessing system.
McNamara, et al., "Diversity Decay in Opportunistic Content Sharing Systems", 2011 IEEE International Symposium an a World of Wireless, Mobile and Multimedia Networks Year: 2011, pp. 1-3, DOI: 10.1109/WoWMoM.2011.5986211 IEEE Conference Publications.
Mei, et al., "Contextual In-Image Advertising", Microsoft Research Asia, pp. 439-448, 2008.
Mei, et al., "VideoSense—Towards Effective Online Video Advertising", Microsoft Research Asia, pp. 1075-1084, 2007.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.
Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.

Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.
Nam, et al., "Audio Visual Content-Based Violent Scene Characterization", Department of Electrical and Computer Engineering, Minneapolis, MN, 1998, pp. 353-357.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.
Odinaev, et al., "Cliques in Neural Ensembles as Perception Carriers", Technion—Israel Institute of Technology, 2006 International Joint Conference on Neural Networks, Canada, 2006, pp. 285-292.
Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.
Jasinschi et al., A Probabilistic Layered Framework for Integrating Multimedia Content and Context Information, 2002, IEEE, p. 2057-2060. (Year: 2002).
Jones et al., "Contextual Dynamics of Group-Based Sharing Decisions", 2011, University of Bath, p. 1777-1786. (Year: 2011).
Iwamoto, "Image Signature Robust to Caption Superimpostion for Video Sequence Identification", IEEE, pp. 3185-3188 (Year: 2006).
Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year; 2016).
Chen, Yixin, James Ze Wang, and Robert Krovetz. "CLUE: cluster-based retrieval of images by unsupervised learning." IEEE transactions on Image Processing 14.8 (2005); 1187-1201. (Year: 2005).
Wusk et al (Non-Invasive detection of Respiration and Heart Rate with a Vehicle Seat Sensor; www.mdpi.com/journal/sensors; Published: May 8, 2018). (Year: 2018).
Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).
Lai, Wei-Sheng, et al. "Deep laplacian pyramid networks for fast and accurate super-resolution." Proceedings of the IEEE conference on computer vision and pattern recognition. 2017 (Year: 2017).
Ren, Shaoqing, et al. "Faster r-cnn: Towards real-time object detection with region proposal networks." IEEE transactions on pattern analysis and machine intelligence 39.6 (2016): 1137-1149 (Year: 2016).
Felzenszwalb, Pedro F., et al. "Object detection with discriminatively trained part-based models." IEEE transactions on pattern analysis and machine intelligence 32.9 (2009): 1627-1645. (Year: 2009).
Lin, Tsung-Yi, et al. "Feature pyramid networks for object detection." Proceedings of the IEEE conference on computer vision and pattern recognition. 2017. (Year: 2017).
Jasinschi, Radu S., et al. "A probabilistic layered framework for integrating multimedia content and context information." 2002 IEEE International Conference on Acoustics, Speech, and Signal Processing. vol. 2. IEEE, 2002. (Year: 2002).
Gull et al., "A Clustering Technique To Rise Up The Marketing Tactics By Looking Out The Key Users Taking Facebook as a Case study", 2014, IEEE International Advance Computing Conference (IACC), 579-585 (Year: 2014).
Zhang et al., "Dynamic Estimation of Family Relations from Photos", 2011, Advances in Multimedia Modeling. MMM 2011, pp. 65-76 (Year: 2011).

(56) References Cited

OTHER PUBLICATIONS

Chen, "CLUE: Cluster-Based Retrieval of Images by Unsupervised Learning", IEEE, vol. 14 pp. 1187-1201 (Year: 2005).
Troung, "CASIS: A System for Concept-Aware Social Image Search", 2012 (Year: 2012).
Cody, W.F. et al. (1995, March). "Querying multimedia data from multiple repositories by content: the Garlic project". In Working Conference on Visual Database Systems (pp. 17-35). Springer, Boston, MA. (Year: 1995).
Schneider, J.M. (2015, October). "New approaches to interactive multimedia content retrieval from different sources". Diss. Universidad Carlos III de Madrid. 274 pages. (Year: 2015).
Yong, N.S. (2008). "Combining multi modal external resources for event-based news video retrieval and question answering". PhD Diss, National University Singapore. 140 pages. (Year: 2008.
Kennedy, L. et al. (2008). "Query-adaptive fusion for multimodal search". Proceedings of the IEEE, 96(4), 567-588. (Year: 2008).
Sang Hyun Joo, "Real time traversability analysis to enhance rough terrain navigation for an 6×6 autonomous vehicle", 2013 (Year: 2013).

\* cited by examiner

SYSTEM AND METHOD FOR COMPLETING A USER PROFILE

CROSS-REFERENCE TO RELATED APPLICATIONS

This application claims the benefit of U.S. Provisional Application No. 62/441,476 filed on Jan. 2, 2017. This application is also a continuation-in-part of U.S. patent application Ser. No. 14/597,324 filed on Jan. 15, 2015, now pending, which claims the benefit of U.S. Provisional Application No. 61/928,468, filed on Jan. 17, 2014. The Ser. No. 14/597,324 application is a continuation-in-part of U.S. patent application Ser. No. 13/766,463 filed on Feb. 13, 2013, now U.S. Pat. No. 9,031,999. The Ser. No. 13/766,463 application is a continuation-in-part of U.S. patent application Ser. No. 13/602,858 filed on Sep. 4, 2012, now U.S. Pat. No. 8,868,619. The Ser. No. 13/602,858 application is a continuation of U.S. patent application Ser. No. 12/603,123 filed on Oct. 21, 2009, now U.S. Pat. No. 8,266,185, which is a continuation-in-part of:

(1) U.S. patent application Ser. No. 12/084,150 having a filing date of Apr. 7, 2009, now U.S. Pat. No. 8,655,801, which is the National Stage of International Application No. PCT/IL2006/001235 filed on Oct. 26, 2006, which claims foreign priority from Israeli Application No. 171577 filed on Oct. 26, 2005, and Israeli Application No. 173409 filed on Jan. 29, 2006;

(2) U.S. patent application Ser. No. 12/195,863 filed on Aug. 21, 2008, now U.S. Pat. No. 8,326,775, which claims priority under 35 USC 119 from Israeli Application No. 185414, filed on Aug. 21, 2007, and which is also a continuation-in-part of the above-referenced U.S. patent application Ser. No. 12/084,150;

(3) U.S. patent application Ser. No. 12/348,888, filed on Jan. 5, 2009, now pending, which is a continuation-in-part of the above-referenced U.S. patent application Ser. No. 12/084,150, and the above-referenced U.S. patent application Ser. No. 12/195,863; and (4) U.S. patent application Ser. No. 12/538,495, filed on Aug. 10, 2009, now U.S. Pat. No. 8,312,031, which is a continuation-in-part of the above-referenced U.S. patent application Ser. No. 12/084,150, the above-referenced U.S. patent application Ser. No. 12/195,863, and the above-referenced U.S. patent application Ser. No. 12/348,888.

All of the applications referenced above are herein incorporated by reference.

TECHNICAL FIELD

The present disclosure relates generally to the analysis of multimedia content associated with a user, and more specifically with determining a missing informational element associated with a user profile based on multimedia content.

BACKGROUND

As the amount of content available over the Internet continues to grow exponentially in size, the task of identifying relevant content has become increasingly cumbersome. Identifying relevant content related to user preferences is of particular interest for online advertisers in order to most effectively offer goods or services that are appropriate for each particular user. A user profile may be created based on user interests; however, the user profile must be sufficiently accurate to provide desirable results.

Existing solutions provide several tools to identify user preferences. Some solutions request active input from users to specify their interests. However, profiles generated for users based on their active input may be inaccurate, as users tend to provide only their current interests, which can change over time. Further, users may only provide partial information due to privacy concerns, resulting in an incomplete user profile. Additionally, requiring active input from users on a regular basis can easily become cumbersome and irritating for users, resulting in decreased interest of users in responding to such requests.

Other existing solutions passively track users' activity through particular web sites, such as social networks. The disadvantage of these solutions is that the information regarding the users that is revealed is typically limited, as users tend to provide only partial information due to privacy concerns. For example, users creating an account on Facebook® will often provide only the mandatory information required for the creation of the account. This information may be insufficient to build an satisfactory user profile.

Additional information about such users may be collected over time, but may take significant amounts of time (i.e., gathered via multiple social media or blog posts over a time period of weeks or months) to be sufficiently useful for accurate identification of user preferences.

Additionally, some existing solutions for determining user preferences attempt to identify and recommend content that is similar to content enjoyed by the user based on information noted by tags related to the enjoyed content including, for example, the subject matter of the content, the entity that created the content, persons appearing in the content, and the like. Such solutions also face challenges due to lack of accurate information regarding what content the user has viewed and determining whether the user has indeed enjoyed such content. As a result, user profiles created using these solutions are often incomplete or inaccurate, and typically are completed through manual correction by users.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for at least partially completing a user profile. The method comprises: analyzing the user profile to identify at least one missing informational element in the user profile, wherein identifying the at least one missing element further comprises determining at least one concept based on the user profile and matching the determined at least one concept to a plurality of category concepts, each concept including a collection of signatures and metadata describing the concept, wherein each category concept is associated with at least one required informational element, wherein each missing informational element is one of the at least one required informational element that is not included in the user profile; sending a query for the missing informational element; and updating at least a portion of the user profile based on a response to the query.

Certain embodiments disclosed herein also include a non-transitory computer readable medium having stored thereon instructions for causing a processing circuitry to perform a process, the process comprising: analyzing a user profile to identify at least one missing informational element in the user profile, wherein identifying the at least one missing element further comprises determining at least one concept based on the user profile and matching the determined at least one concept to a plurality of category concepts, each concept including a collection of signatures and metadata describing the concept, wherein each category concept is associated with at least one required informational element, wherein each missing informational element is one of the at least one required informational element that is not included in the user profile; sending a query for the missing informational element; and updating at least a portion of the user profile based on a response to the query.

Certain embodiments disclosed herein also include a system for at least partially completing a user profile. The system comprises: a processing circuitry; and a memory, the memory containing instructions that, when executed by the processing circuitry, configure the system to: analyze the user profile to identify at least one missing informational element in the user profile, wherein identifying the at least one missing element further comprises determining at least one concept based on the user profile and matching the determined at least one concept to a plurality of category concepts, each concept including a collection of signatures and metadata describing the concept, wherein each category concept is associated with at least one required informational element, wherein each missing informational element is one of the at least one required informational element that is not included in the user profile; send a query for the missing informational element; and update at least a portion of the user profile based on a response to the query.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
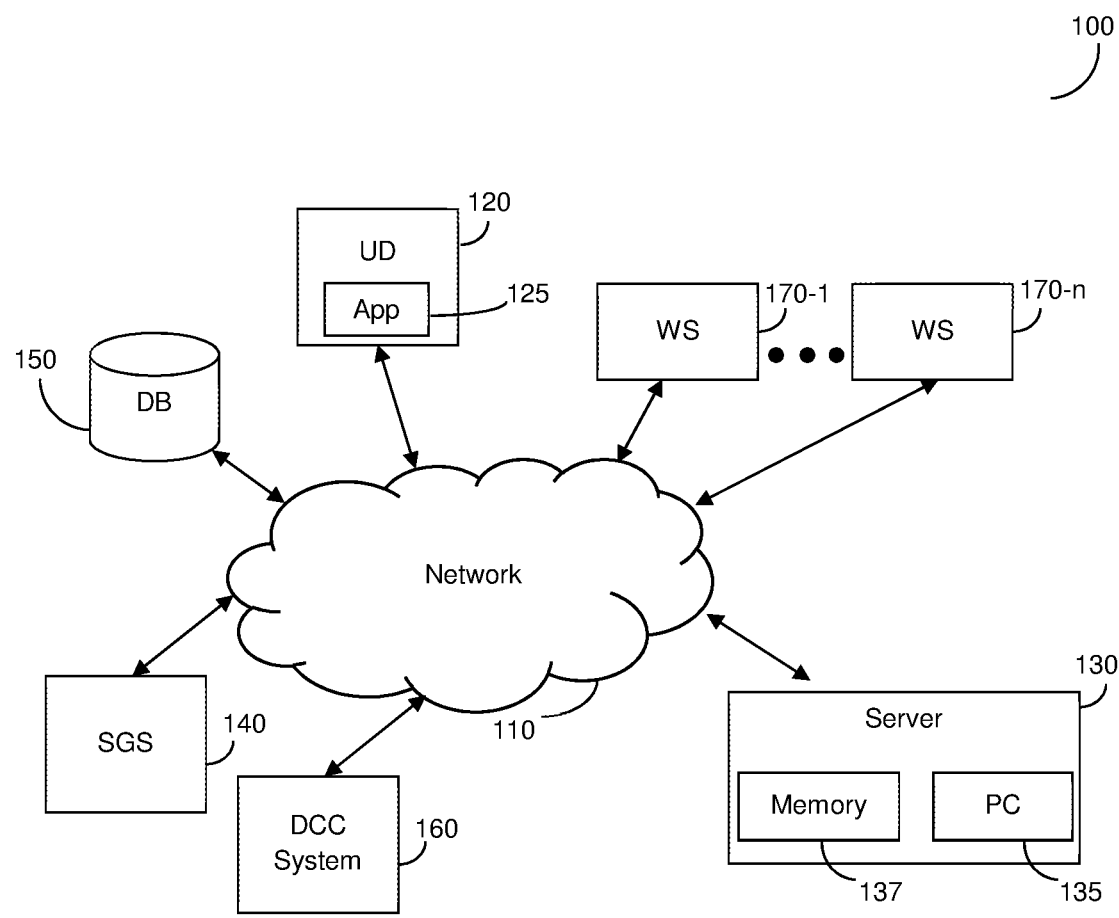
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows a network diagram 100 utilized to describe the various disclosed embodiments. A user device 120, a server 130, a signature generator system (SGS) 140, a database 150, a deep content classification (DCC) system 160, and a plurality of web sources 170-1 through 170-$n$ are communicatively connected via a network 110. The network 110 may include the Internet, the world-wide-web (WWW), a local area network (LAN), a wide area network (WAN), a metro area network (MAN), and other networks capable of enabling communication between elements of a system 100.

The user device 120 may be, but is not limited to, a mobile phone, a smartphone, a personal computer (PC), a tablet computer, a wearable computing device, and other kinds of wired and mobile devices capable of capturing, uploading, browsing, viewing, listening, filtering, and managing MMCEs as further discussed herein below. The user device 120 may have installed thereon an application 125. The application 125 may be downloaded from an application repository, such as the Apple® AppStore®, Google Play®, or any repository hosting software applications for download.

The user device 120 includes a storage (not shown) containing one or more MMCEs, such as, but not limited to, an image, a photograph, a graphic, a screenshot, a video stream, a video clip, a video frame, an audio stream, an audio clip, combinations thereof, portions thereof, and the like.

The web sources 170-1 through 170-$n$ (hereinafter referred to collectively as web sources 170, merely for simplicity) are connected to the network 110, where 'n' is an integer equal to or greater than 1. The web sources 170 include data sources or files available over, for example, the Internet. To this end, the web sources 170 may include, but are not limited to, websites, web-pages, social network platforms, search engines, public and private databases, and the like. The web sources 170 include one or more multi-media content elements (MMCEs), such as, but not limited to, an image, a photograph, a graphic, a screenshot, a video stream, a video clip, a video frame, an audio stream, an audio clip, combinations thereof, portions thereof, and the like.

A server 130 is connected to the network 110 and is configured to communicate with the user device 120 and the web sources 170. The server 130 may include a processing circuitry (PC) 135 and a memory 137. The processing circuitry 135 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

In an embodiment, the memory 137 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 135 to perform the various processes described herein. Specifically, the instructions, when executed, cause the processing circuitry 135 to identify a missing informational element of a user profile and send a query regarding the missing informational element, as discussed further herein below.

The SGS 140 and the DCC system 160 are utilized by the server 130 to perform the various disclosed embodiments. The SGS 140 and the DCC system 160 may be connected to the server 130 directly (not shown) or through the network 110 (as shown in FIG. 1). In certain configurations, the DCC system 160 and the SGS 140 may be embedded in the server 130. In an embodiment, the server 130 is connected to or includes an array of computational cores configured as discussed in more detail below.

In an embodiment, the server 130 is configured to access an MMCE from the user device 120 or the web sources 170, and to send the MMCE to the SGS 140, the DCC system 160, or both. The access may include receiving or retrieving the MMCE. The decision of which to be used (the SGS 140, the DCC system 160, or both) may be a default configuration, or may depend on the circumstances of the particular MMCE being analyzed, e.g., the file type, the file size of the MMCE, the clarity of the content within the MMCE, and the like. In an embodiment, the SGS 140 receives the MMCE and returns signatures generated thereto. The generated signature(s) may be robust to noise and distortion as discussed regarding FIGS. 5 and 6 below.

According to another embodiment, the analysis of the MMCE may further be based on a concept structure (hereinafter referred to as a "concept") determined for the MMCE. A concept is a collection of signatures representing elements of the unstructured data and metadata describing the concept. As a non-limiting example, a 'Superman concept' is a signature-reduced cluster of signatures describing elements (such as MMCEs) related to, e.g., a Superman cartoon; and a set of metadata providing a textual representation of the Superman concept. Techniques for generating concept structures are also described in the above-referenced U.S. Pat. No. 8,266,185 to Raichelgauz et al., the contents of which are hereby incorporated by reference.

According to this embodiment, a query is sent to the DCC system 160 to match the MMCE to at least one concept. The identification of a concept matching the MMCE includes matching signatures generated for the MMCE (such signature(s) may be generated by the SGS 140 or the DCC system 160) and comparing the generated signatures to reference signatures representing predetermined concepts. The signatures to which the MMCE is compared may be stored in and accessed from the database 150. The matching can be performed across all concepts maintained by the system DCC 160.

It should be appreciated that generating signatures allows for more accurate analysis of MMCEs in comparison to, for example, relying on metadata alone. The signatures generated for the MMCEs allow for recognition and classification of MMCEs such as content-tracking, video filtering, multimedia taxonomy generation, video fingerprinting, speech-to-text, audio classification, element recognition, video/image search and any other application requiring content-based signatures generation and matching for large content volumes such as, web and other large-scale databases. For example, a signature generated by the SGS 140 for a picture showing a car enables accurate recognition of the model of the car from any angle at which the picture was taken.

Based on the MMCEs, generated signatures, concepts, or a combination thereof, the server 130 is configured to identify a user preference. A user preference may be used in the generation of a user profile, where the user profile includes indications of a user interest. As an example, if a user is identified in several images riding a bicycle, the user profile may indicate that the user is interested in the subjects of "bicycle", "sport", "outdoor activity", and the like. The profile may further include informational elements, such as what type of bicycle the user is interested in (e.g., road bicycle or mountain bicycle), what kind of outdoor activity (e.g., extreme or leisure), a user's favorite location(s) connected to the activity (e.g., a particular park), and the like In an embodiment, the server 130 may be configured to identify missing informational elements in a user profile. Continuing with the above example, the server 130 may be configured to identify if the type of bicycle is unknown, e.g., it is not present within the user profile. If so, the server 130 may send a query to retrieve the missing informational element, e.g., by sending a message. The query may be sent to one of the web sources 170 (e.g., such that query results are returned by a search engine implemented in one of the web sources 170), or may be sent directly to the user device 120 (e.g., as a notification including a prompt for the missing element).

In an embodiment, the server 130 is configured to update the user profile based on a response to the query. The updated user profile may be saved, e.g., in the database 150.

It should be noted that only one user device 120 and one application 125 are discussed with reference to FIG. 1 merely for the sake of simplicity. However, the embodiments disclosed herein are applicable to a plurality of user devices that can communicate with the server 130 via the network 110, where each user device includes at least one application.

Figure 2:
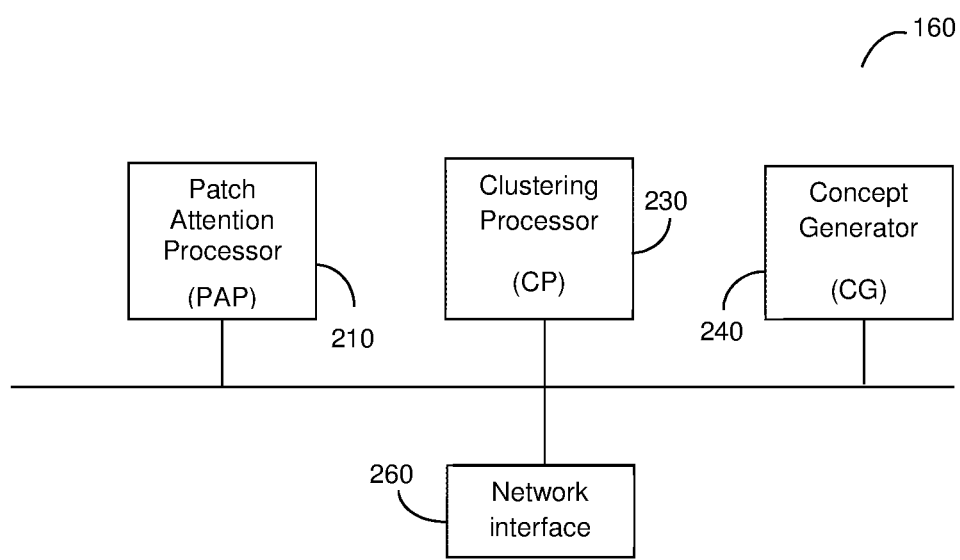
FIG. 2 is an example schematic diagram of a Deep Content Classification system for creating concepts according to an embodiment.

FIG. 2 shows an example diagram of a DCC system 160 for creating concepts. The DCC system 160 is configured to receive an MMCE, for example from the server 130, the user device 120, or one of the web sources 170, via a network interface 260.

The MMCE is processed by a patch attention processor (PAP) 210, resulting in a plurality of patches that are of specific interest, or otherwise of higher interest than other patches. A more general pattern extraction, such as an attention processor (AP) (not shown) may also be used in lieu of patches. The AP receives the MMCE that is partitioned into items; an item may be an extracted pattern or a patch, or any other applicable partition depending on the type of the MMCE. The functions of the PAP 210 are described herein below in more detail.

The patches that are of higher interest are then used by a signature generator, e.g., the SGS 140 of FIG. 1, to generate signatures based on the patch. It should be noted that, in some implementations, the DCC system 160 may include the signature generator. A clustering processor (CP) 230 inter-matches the generated signatures once it determines that there are a number of patches that are above a pre-defined threshold. The threshold may be defined to be large enough to enable proper and meaningful clustering. With a plurality of clusters, a process of clustering reduction takes place so as to extract the most useful data about the cluster and keep it at an optimal size to produce meaningful results. The process of cluster reduction is continuous. When new signatures are provided after the initial phase of the operation of the CP 230, the new signatures may be immediately checked against the reduced clusters to save on the operation of the CP 230. A more detailed description of the operation of the CP 230 is provided herein below.

A concept generator (CG) 240 is configured to create concept structures (hereinafter referred to as concepts) from the reduced clusters provided by the CP 230. Each concept comprises a plurality of metadata associated with the reduced clusters. The result is a compact representation of a concept that can now be easily compared against an MMCE to determine if the received MMCE matches a concept stored, for example, in the database 150 of FIG. 1. This can be done, for example and without limitation, by providing a query to the DCC system 160 for finding a match between a concept and a MMCE.

It should be appreciated that the DCC system 160 can generate a number of concepts significantly smaller than the number of MMCEs. For example, if one billion ($10^9$) MMCEs need to be checked for a match against another one billion MMCEs, typically the result is that no less than $10^9 \times 10^9 = 10^{18}$ matches have to take place. The DCC system 160 would typically have around 10 million concepts or less, and therefore at most only $2 \times 10^6 \times 10^9 = 2 \times 10^{15}$ comparisons need to take place, a mere 0.2% of the number of matches that have had to be made by other solutions. As the number of concepts grows significantly slower than the number of MMCEs, the advantages of the DCC system 160 would be apparent to one with ordinary skill in the art.

The user profile is generated based on the generated signatures, concepts, or both, which enables determination of the user's preferences and interests.

Figure 3:
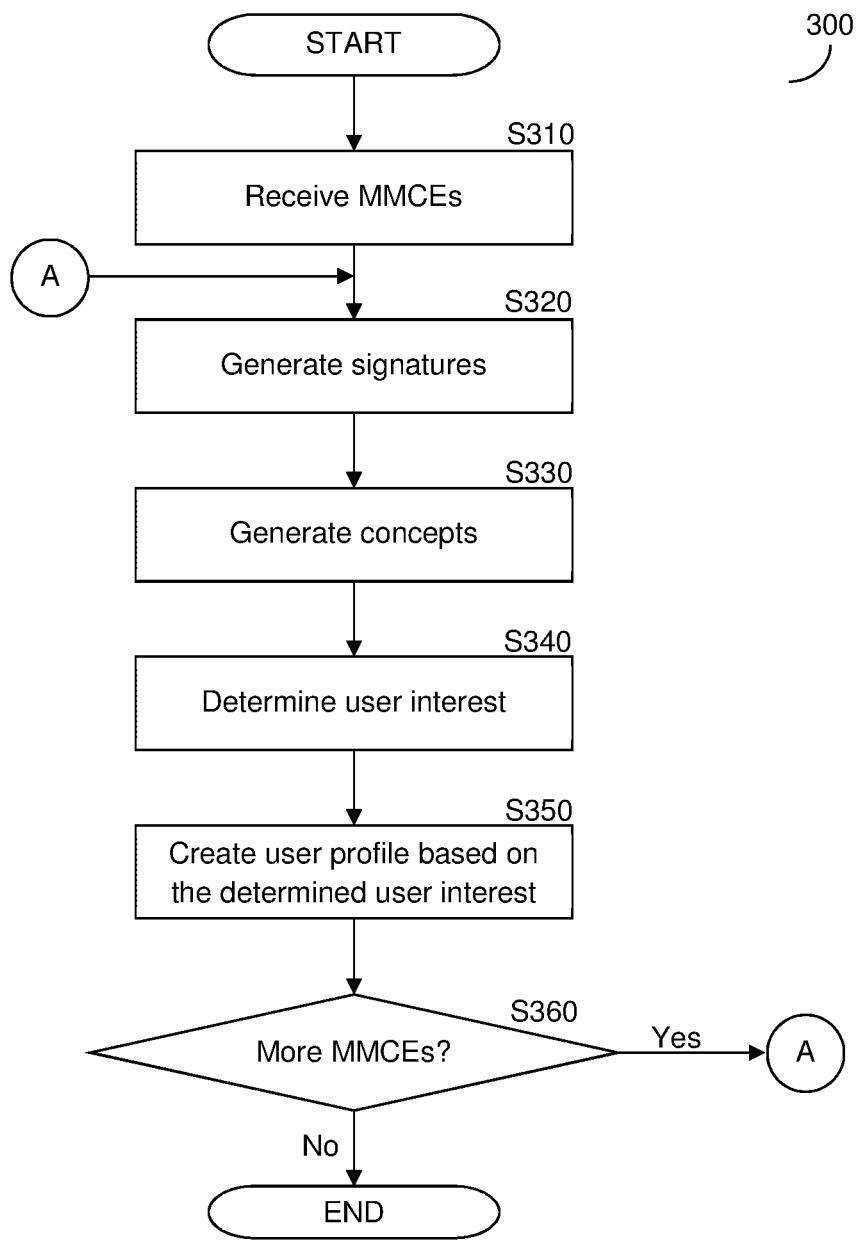
FIG. 3 is a flowchart illustrating a method for creating a user profile according to an embodiment.

FIG. 3 is a flowchart 300 illustrating a method for creating a user profile according to an embodiment. At S310, MMCEs are received. In an embodiment, the MMCEs are received from a user device or from a web source, which may include, but is not limited to, social networks, web blogs, news feeds, and the like. The social networks may include, for example, Google+®, Facebook®, Twitter®, Instagram®, and so on.

MMCEs may include an image, a graphic, a video stream, a video clip, an audio stream, an audio clip, a video frame, a photograph, combinations thereof and portions thereof. In an embodiment, the MMCEs are captured by a user device.

At S320, at least one signature for each received MMCE is generated. The signatures may be generated by the SGS 140 of FIG. 1, as described hereinabove. In an embodiment, the signatures are generated by a signature generation system or a deep-content classification system, as discussed herein, which may generate a signature for an MMCE via a large number of at least partially statistically independent computational cores. The signatures may be generated for one or more elements depicted within an MMCE. For example, if an MMCE is a photograph of a street corner, where the photograph includes an image of various elements, such as a person, a dog, a street sign, and a tree, a signature may be generated for each of the various elements.

At S330, at least one concept based on the at least one signature is generated for each MMCE. The concepts are generated by a process of inter-matching of the signatures once it is determined that there is a number of elements therein above a predefined threshold. That threshold needs to be large enough to enable proper and meaningful clustering.

Each concept is a collection of signatures representing MMCEs and metadata describing the concept, and acts as an abstract description of the content to which the signature was generated. As a non-limiting example, a 'Superman concept' is a signature-reduced cluster of signatures representing elements (such as MMCEs) related to, e.g., a Superman cartoon, and a set of metadata including a textual representation of the Superman concept. As another example, metadata of a concept represented by the signature generated for a picture showing a bouquet of red roses is "flowers." As yet another example, metadata of a concept represented by the signature generated for a picture showing a bouquet of wilted roses is "wilted flowers".

In one embodiment, S330 includes querying a concept-based database using the generated signatures, wherein a previously generated concept may be matched to the MMCE without requiring the generation of a new concept.

At S340, at least one user interest is determined based on the generated signatures, the concepts, or both. According to one embodiment, a user interest may be determined based on the frequency of appearance of a person or item, user interactions related to the concept or MMCE, preferences of other users connected to the user, and the like. As a non-limiting example, if a user has indicated that they like multiple pictures of a particular dog on a social network, it may be determined that the dog is included as a user interest. Further, if the user has frequently uploaded pictures of the dog to multiple social networks, it may likewise be determined that the dog is included as a user interest.

In S350, a user profile is created based on the determined user interest. The user profile may be saved, e.g., in a database, for future reference. It should be noted that if a user profile already exists in the database, the user profile may be updated to include the user interest determined in S340. For example, if a user profile related to the user exists but does not contain information related to any dogs, the profile may be updated to include the dog as a user interest.

At S360, it is checked whether there are additional MMCEs to analyze, and if so, execution continues with S320; otherwise, execution terminates.

As a non-limiting example for the process described in FIG. 3, a picture of a user riding a bicycle is uploaded to the user's profile page in Facebook®. The image is then analyzed, and a signature and at least one concept is generated respective thereto. A comment made by the user stating: "I love those field trips" is identified. Based on analysis of the concept of the uploaded picture and the user's comment, the user profile is determined as positive for field trips. The user profile is then stored or updated (if, e.g., the user profile already existed prior to this example) in a database for further use.

Figure 4:
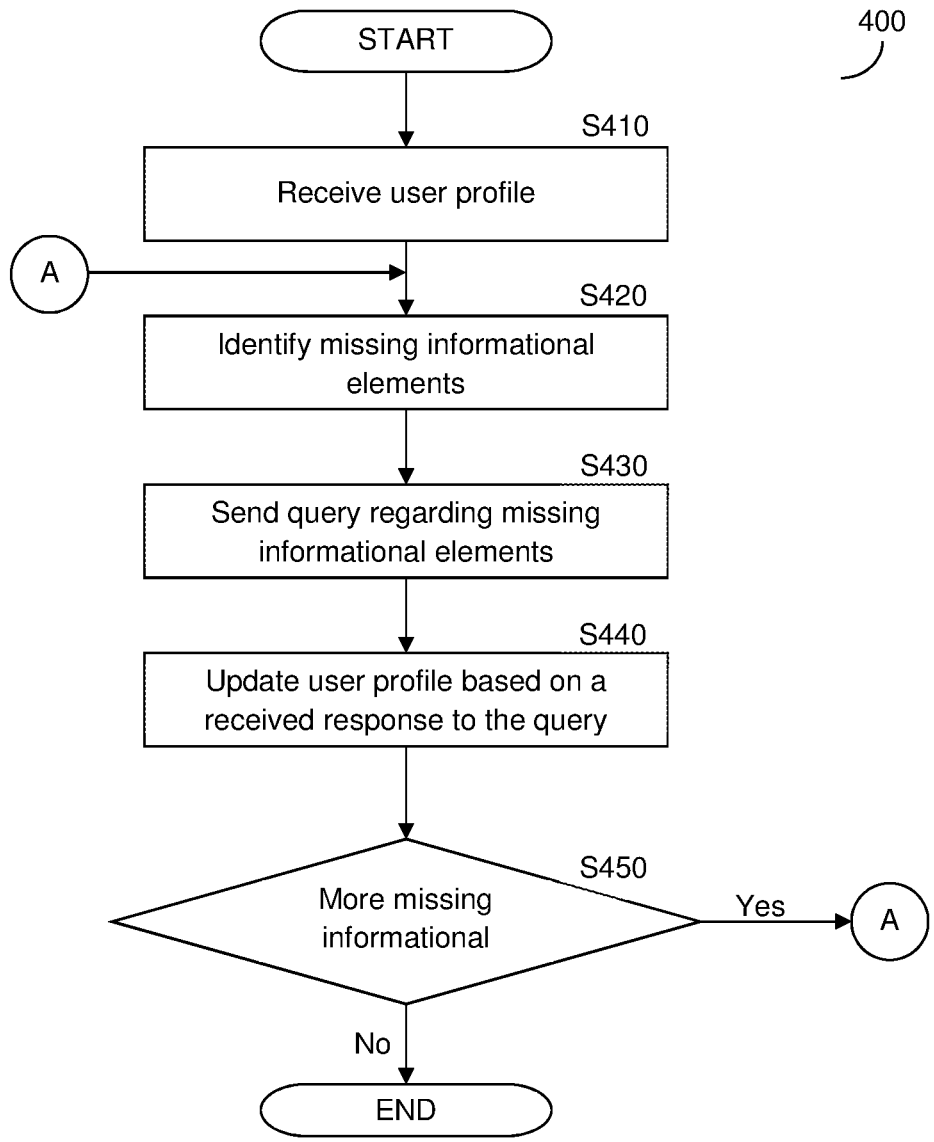
FIG. 4 is a flowchart illustrating a method for at least partially completing a user profile according to an embodiment.

FIG. 4 is a flowchart 400 illustrating a method for querying for completing a user profile according to an embodiment. Specifically, the method may be utilized to partially complete a user profile missing one or more informational elements related to user interests.

At S410, a user profile is received. The user profile may be, for example, a user profile created as described herein above with respect to FIG. 3, or may be a user profile previously generated and stored, e.g., on a database. The user profile may include one or more user interests as discussed above with respect to FIG. 3.

At S420, missing informational elements are identified within the user profile. Missing informational elements are elements related to user interests that are indicated in the user profile. In an embodiment, the identification may be made by comparing concepts representing the user interests in the user profile with a predetermined set of concepts representing required informational elements related to that concept.

To this end, in an embodiment, S420 may include matching concepts representing the user interests indicated in the user profile to category concepts representing general categories of user profile information. Example category concepts may include, but are not limited to, pets, hobbies, family members, friends, place of work, home, hangout spots, specific instances thereof (e.g., dogs as pets, biking as a hobby, etc.), and the like. In a further embodiment, S420 may also include generating signatures for textual representations of the user interests and determining, based on the generated signatures, a concept representing each user interest. Determining concepts for the user interests may include matching the generated signatures to signatures of concepts in a concept database as described further herein above. Alternatively, the user profile may include predetermined concepts (e.g., concepts that were previously generated as described herein above) representing each user interest.

Each category concept may be associated with a respective predetermined set of required informational elements. As a non-limiting example, if a user interest within the user profile includes a particular dog as indicated by a concept representing the dog, the user interest concept may be matched to a category concept of representing "pet dog" that is associated with required informational elements including name, breed, age, length of ownership by the user, food preferences, recreational preferences, and the like. If, for example, the dog's age and breed are known, but its name is unknown, the name may be identified as a missing informational element.

Each informational element may be indicated in, for example, a field of a user profile. To this end, in some implementations, the missing informational elements may include informational elements corresponding to incomplete fields of the user profile. For example, when the user profile includes a field "job title" that has an empty value, job title may be determined as a missing informational element. Thus, the missing informational elements may be unknown data items in a user profile representing the user's life, routines, hobbies, and the like.

In another embodiment, the missing informational elements may be determined based on analysis of one or more clusters of MMCEs associated with the user profile. The analysis of the clusters may include, but is not limited to, generating signatures for the MMCEs, determining concepts appearing in the MMCEs, generating a validity score for each identified concept, and determining missing informational elements based on the validity scores. In an example implementation, each missing informational element corresponds to a concept having a validity score below a predetermined threshold.

In a further embodiment, the missing elements are identified by comparing concepts representing the user interests to known concepts associated with other user profiles, e.g., from a database. For example, if a user interest includes a dog, a concept related to the dog may be compared to concepts of user interests related to other user profiles in a database. If the other user profiles include a dog's name, breed, and age, and the current user profile only include the dog's breed and age, the dog's name will be identified as a missing informational element.

At S430, one or more queries is sent regarding the missing informational element. The query may be fed to a search engine, a search bar in a social network website, or sent directly to a user, e.g., to a user device. The query may include text, images, portions thereof, combinations thereof, and the like. For example, a query may include an image of a dog taken from an MMCE together with the phrase "What is this dog's name?" Additionally, the query may be gamified in order to more easily engage the user. As a non-limiting example, a plurality of faces that are determined to potentially be part of the user's family are presented together with the query "Family Album" and a request to mark which person is and is not a family member.

Each sent query may be, for example, associated with the corresponding missing informational element. As a non-limiting example, an informational element of "brands" for the category "mountain biking" may be associated with a query of "What brand of mountain bikes do you prefer?" such that, when the "brand" informational element is missing, that query may be sent.

At S440, the user profile is updated based on a response received in reply to the sent query. For example, the user interest of "dog" within the user profile may be updated to include the received response to "What is this dog's name?" The updated user profile may be saved, e.g., in a database.

At S450, it is checked whether additional missing items may exist within the user profile, and if so, execution continues with S420; otherwise, execution terminates.

As a non-limiting example, when images analyzed to identify user interests include images showing the user standing in the entrance of office buildings, user interests of a user include "office." Signatures of a concept representing the user interest are matched to signatures representing category concepts, and a category concept representing "job" is determined as matching. The "job" concept is associated with required informational elements of "job title" and "place of employment." When the user profile indicates a job title of "CEO" but not a place of employment, the place of employment is identified as a missing informational element. A query of "Where do you work?" associated with the "place of employment" concept is sent to the user. Based on a user response of "ABC Contractors, Manhattan branch," the user profile may be updated with respect to place of employment.

Figure 5:
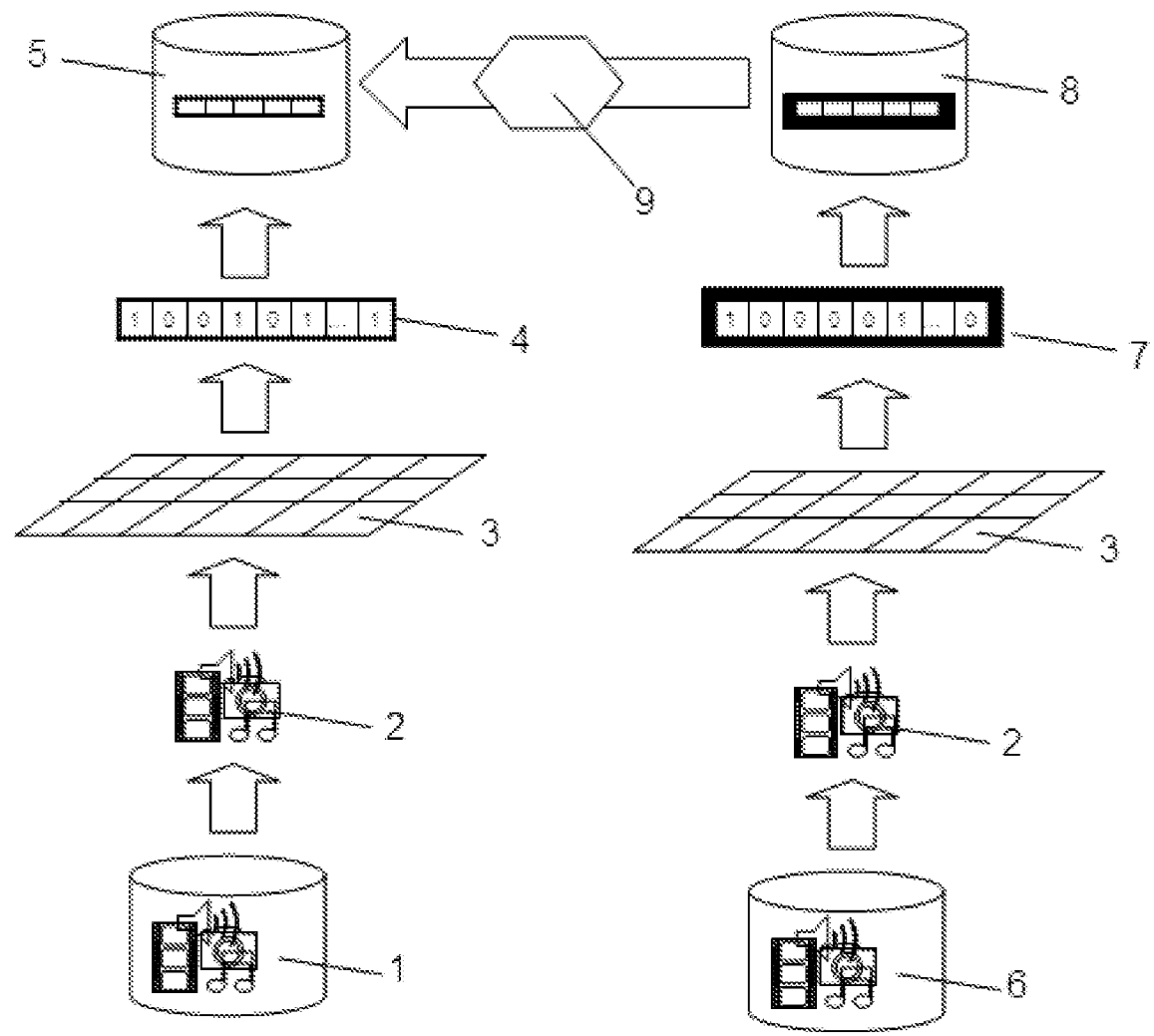
FIG. 5 is a block diagram depicting the basic flow of information in the signature generator system.
Figure 6:
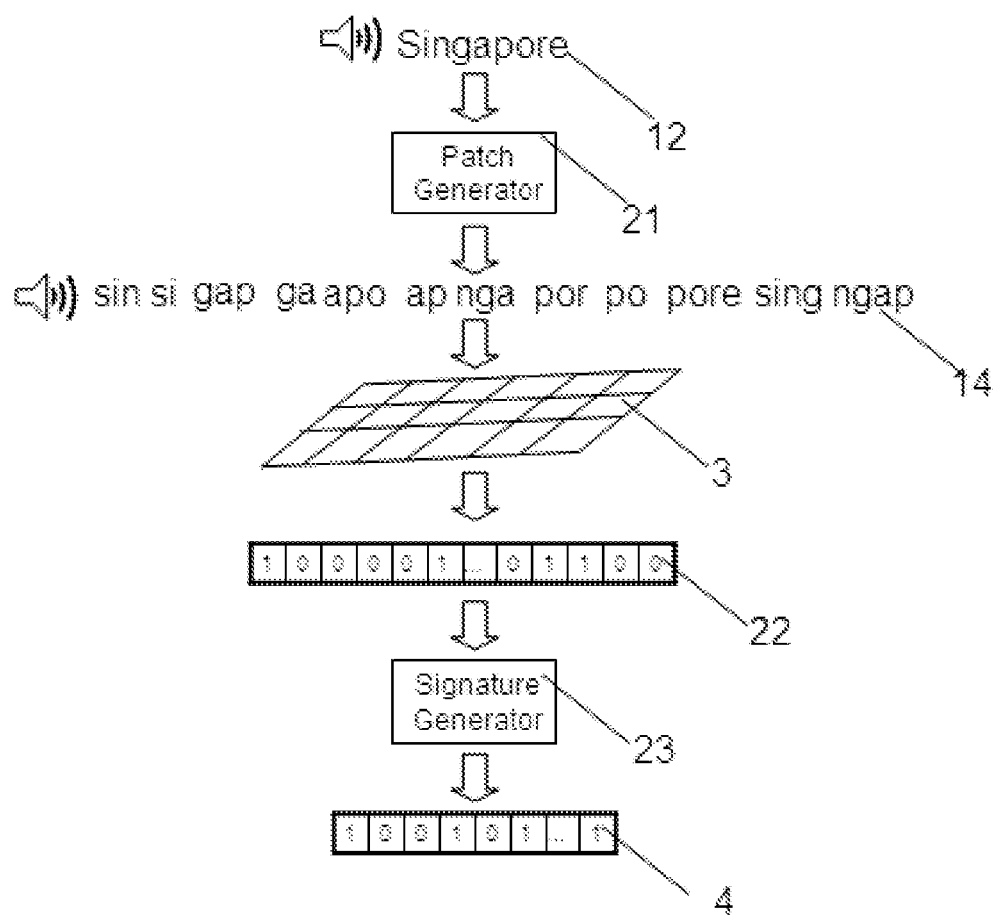
FIG. 6 is a diagram showing the flow of patches generation, response vector generation, and signature generation in a large-scale speech-to-text system.

FIGS. 5 and 6 illustrate the generation of signatures for the multimedia content elements by the SGS 120 according to one embodiment. An exemplary high-level description of the process for large scale matching is depicted in FIG. 5. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below.

The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 6. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames. In an embodiment, the signature generator 140 is configured with a plurality of computational cores to perform matching between signatures.

The Signatures' generation process is now described with reference to FIG. 6. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: one which is a Signature vector, and one which is a Robust Signature vector.

For generation of signatures robust to additive noise, such as White-Gaussian-Noise, scratch, etc., but not robust to distortions, such as crop, shift and rotation, etc., a core $Ci=\{n_i\}$ ($1 \leq i \leq L$) may consist of a single leaky integrate-to-threshold unit (LTU) node or more nodes. The node $n_i$ equations are:

$$V_i = \sum_j w_{ij} k_j$$

$$n_i = \theta(Vi - Thx)$$

where, $\theta$ is a Heaviside step function; $w_{ij}$ is a coupling node unit (CNU) between node i and image component j (for example, grayscale value of a certain pixel j); $k_j$ is an image component 'j' (for example, grayscale value of a certain pixel j); $Th_X$ is a constant Threshold value, where 'x' is 'S' for Signature and 'RS' for Robust Signature; and Vi is a Coupling Node Value.

The Threshold values $Th_X$ are set differently for Signature generation and for Robust Signature generation. For example, for a certain distribution of $V_i$ values (for the set of nodes), the thresholds for Signature ($Th_S$) and Robust Signature ($Th_{RS}$) are set apart, after optimization, according to at least one or more of the following criteria:

1: For:

$$V_i > Th_{RS}$$

$$1-p(V>Th_S)-1-(1-\varepsilon)^l \ll 1$$

i.e., given that I nodes (cores) constitute a Robust Signature of a certain image I, the probability that not all of these I nodes will belong to the Signature of same, but noisy image, is sufficiently low (according to a system's specified accuracy).

2:

$$p(V_i > Th_{RS}) \approx l/L$$

i.e., approximately I out of the total L nodes can be found to generate a Robust Signature according to the above definition.

3: Both Robust Signature and Signature are Generated for a Certain Frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

A detailed description of the Computational Core generation and the process for configuring such cores is discussed in more detail in the above referenced U.S. Pat. No. 8,655,801, the contents of which are hereby incorporated by reference.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for at least partially completing a user profile, comprising:
analyzing, by a computerized system, the user profile to identify at least one missing informational element in the user profile, wherein the user profile is indicative of one or more user interests; wherein the one or more user interests are determined by the computerized system; wherein a missing informational element is related to at least one user interest of the one or more user interests; wherein identifying the at least one missing element comprises determining at least one concept based on the user profile and matching the determined at least one concept to a plurality of concepts, each concept of the plurality of concepts including a collection of signatures and metadata describing the concept, wherein each missing informational element is one of the at least one required informational element that is not included in the user profile;
analyzing a plurality of multimedia content elements (MMCEs), wherein the analysis further comprises:
generating at least one signature for each MMCE;
determining at least one concept for each MMCE based on the at least one signature generated for the MMCE;
wherein the one or more user interests are identified based on the determined concepts;
wherein the identifying, based on the determined concepts, of the at least one user interest is responsive to a frequency of appearance of a person or item in the MMCEs;
sending a query for the missing informational element; and
updating at least a portion of the user profile based on a response to the query.

2. The method of claim 1, wherein determining the at least one concept for each MMCE further comprises: querying a concept-based database using the at least one signature generated for the MMCE.

3. The method of claim 1 wherein the plurality of concepts are general categories of user profile information.

4. The method of claim 1 wherein each concept of the plurality of concepts is a category concept that is associated with at least one required informational element.

5. The method of claim 1, wherein identifying the at least one missing informational element includes comparing the user profile to the at least one required informational element for each matching category concept, wherein each missing informational element corresponds to an incomplete field of the user profile.

6. The method according to claim 1 wherein the analyzing of the plurality of MMCEs comprises processing each MMCE by a patch attention processor to find MMCE patches of higher interest that other MMCE patches, and generating a signature of the MMCE based on the MMCE patches of higher interest.

7. The method according to claim 1 wherein the identifying, based on the determined concepts, of the at least one user interest is responsive to interests of other users connected to the user.

8. The method according to claim 1 wherein the analyzing of the user profile to identify at least one missing informational element in the user profile further comprises comparing concepts representing the user interests to known concepts associated with other user profiles in a database.

9. A non-transitory computer readable medium having stored thereon instructions for causing a processing circuitry of a computerized system to perform a process, the process comprising:
analyzing a user profile to identify at least one missing informational element in the user profile, wherein the user profile is indicative of one or more user interests; wherein the one or more user interests are determined by the computerized system; wherein a missing informational element is related to at least one user interest of the one or more user interests; wherein identifying the at least one missing element further comprises determining at least one concept based on the user profile and matching the determined at least one concept to a plurality of concepts, each concept of the plurality of concepts including a collection of signatures and metadata describing the concept, wherein each missing informational element is one of the at least one required informational element that is not included in the user profile;
analyzing a plurality of multimedia content elements (MMCEs), wherein the analysis further comprises:
generating at least one signature for each MMCE;
determining at least one concept for each MMCE based on the at least one signature generated for the MMCE;
identifying, based on the determined concepts, at least one user interest; and
creating the user profile based on the identified at least one user interest;
wherein the identifying, based on the determined concepts, of the at least one user interest is responsive to a frequency of appearance of a person or item in the MMCEs comparing the user profile to user profiles of users;
sending a query for the missing informational element; and
updating at least a portion of the user profile based on a response to the query.

10. The non-transitory computer readable medium according to claim 9, wherein the analyzing of the user profile to identify at least one missing informational element in the user profile further comprises comparing concepts representing the user interests to known concepts associated with other user profiles in a database.

11. The non-transitory computer readable medium according to claim 9, wherein the determining of the at least one concept for each MMCE further comprises: querying a concept-based database using the at least one signature generated for the MMCE.

12. The non-transitory computer readable medium according to claim 9 wherein the plurality of concepts are general categories of user profile information.

13. The non-transitory computer readable medium according to claim 9 wherein each concept of the plurality of concepts is a category concept that is associated with at least one required informational element.

14. The non-transitory computer readable medium according to claim 9, wherein the identifying of the at least one missing informational element includes comparing the user profile to the at least one required informational element for each matching category concept, wherein each missing informational element corresponds to an incomplete field of the user profile.

15. A computerized system for at least partially completing a user profile, comprising: a processing circuitry; and a memory, the memory containing instructions that, when executed by the processing circuitry, configure the system to:
analyze the user profile to identify at least one missing informational element in the user profile, wherein the user profile is indicative of one or more user interests; wherein the one or more user interests are determined by the computerized system; wherein a missing informational element is related to at least one user interest of the one or more user interests; wherein identifying the at least one missing element further comprises determining at least one concept based on the user profile and matching the determined at least one concept to a plurality of concepts, each concept of the plurality of concepts including a collection of signatures and metadata describing the concept, wherein each missing informational element is one of the at least one required informational element that is not included in the user profile;

analyze a plurality of multimedia content elements (MMCEs), wherein the analysis further comprises generating at least one signature for each MMCE; determine at least one concept for each MMCE based on the at least one signature generated for the MMCE; and wherein the one or more user interests are identified based on the determined concepts;

wherein the identifying, based on the determined concepts, of the at least one user interest is responsive to a frequency of appearance of a person or item in the MMCEs comparing the user profile to user profiles of users;

send a query for the missing informational element; and update at least a portion of the user profile based on a response to the query.

16. The system of claim 15, wherein the system is further configured to: query a concept-based database using the at least one signature generated for the MMCE.

17. The system of claim 15, wherein each signature is robust to noise and distortion.

18. The system of claim 15, wherein the plurality of concepts are general categories of user profile information.

19. The system of claim 15, wherein each concept of the plurality of concepts is a category concept that is associated with at least one required informational element.

* * * * *